(12) United States Patent
Rongong et al.

(10) Patent No.: US 9,444,742 B2
(45) Date of Patent: *Sep. 13, 2016

(54) MITIGATING THE EFFECTS OF CONGESTED INTERFACES ON A FABRIC

(71) Applicant: Cisco Technology, Inc., San Jose, CA (US)

(72) Inventors: Arpan Rongong, Santa Clara, CA (US); Madhava Rao Cheethirala, San Jose, CA (US); Nagasree Ravindra, Cupertino, CA (US); Pralhad Katti, San Ramon, CA (US); Ranganathan Rajagopalan, Fremont, CA (US); Subrata Banerjee, Los Altos, CA (US); Venkataraman Swaminathan, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 142 days.

This patent is subject to a terminal disclaimer.

(21) Appl. No.: 14/042,225

(22) Filed: Sep. 30, 2013

(65) Prior Publication Data

US 2014/0086054 A1 Mar. 27, 2014

Related U.S. Application Data

(63) Continuation of application No. 12/903,787, filed on Oct. 13, 2010, now Pat. No. 8,593,965.

(60) Provisional application No. 61/365,742, filed on Jul. 19, 2010.

(51) Int. Cl.
*H04L 12/26* (2006.01)
*H04L 12/801* (2013.01)
*H04L 12/931* (2013.01)
*H04L 29/08* (2006.01)

(52) U.S. Cl.
CPC ............... *H04L 47/12* (2013.01); *H04L 49/35* (2013.01); *H04L 49/356* (2013.01); *H04L 49/505* (2013.01); *H04L 49/506* (2013.01); *H04L 67/1097* (2013.01)

(58) Field of Classification Search
CPC ... H04L 47/12; H04L 49/356; H04L 49/505; H04L 49/506; H04L 49/35; H04L 67/1097
See application file for complete search history.

(56) References Cited

U.S. PATENT DOCUMENTS

| 6,130,880 A * | 10/2000 | Naudus et al. | 370/235 |
| 6,886,141 B1 | 4/2005 | Kunz et al. | |
| 7,085,846 B2 * | 8/2006 | Jenne et al. | 709/232 |
| 7,324,441 B1 * | 1/2008 | Kloth et al. | 370/229 |
| 7,433,326 B2 * | 10/2008 | Desai et al. | 370/255 |

(Continued)

OTHER PUBLICATIONS

US Office Action dated Dec. 19, 2012, U.S. Appl. No. 12/903,787.

(Continued)

*Primary Examiner* — Chandrahas Patel
*Assistant Examiner* — Lan Huong Truong

(57) ABSTRACT

Techniques are provided for mitigating the effects of slow or no drain devices on a fabric. One or more of the described embodiments can be used alone or in combination to address problems associated with inter-switch link blocking and to address the situation where flows which are not associated with slow/no drain devices suffer the negative impacts of slow or no drain devices on a fabric.

18 Claims, 11 Drawing Sheets

(56) References Cited

U.S. PATENT DOCUMENTS

| | | |
|---|---|---|
| 7,649,903 B2 | 1/2010 | Dropps et al. |
| 7,760,717 B2 * | 7/2010 | Atkinson ............... 370/386 |
| 2003/0115355 A1 * | 6/2003 | Cometto et al. ......... 709/234 |
| 2005/0018604 A1 | 1/2005 | Dropps et al. |
| 2005/0108444 A1 * | 5/2005 | Flauaus et al. ............ 710/15 |
| 2006/0092845 A1 | 5/2006 | Kwan et al. |
| 2006/0203725 A1 | 9/2006 | Paul et al. |
| 2009/0041029 A1 * | 2/2009 | Dropps et al. ......... 370/395.62 |

OTHER PUBLICATIONS

US Notice of Allowance dated Jul. 9, 2013, U.S. Appl. No. 12/903,787.

* cited by examiner

MITIGATING THE EFFECTS OF CONGESTED INTERFACES ON A FABRIC

RELATED APPLICATIONS

This application is a continuation of U.S. patent application Ser. No. 12/903,787, filed on Oct. 13, 2010, titled "MITIGATING THE EFFECTS OF CONGESTED INTERFACES ON A FABRIC," by Rongong et al, which is a non-provisional application that claims priority to U.S. Provisional Patent Application No. 61/365,742, filed Jul. 19, 2010, and titled "MITIGATING THE EFFECTS OF CONGESTED INTERFACES ON A FABRIC," each which are incorporated herein by reference in its entirety for all purposes.

BACKGROUND

1. Field of the Invention

The present invention relates to network technology and, more particularly, to improving flow control in networks by mitigating the effects of congested interfaces on a fabric.

2. Background of the Invention

Various techniques have been developed to address congestion in a network. For example, for the Internet, which operates using Ethernet and TCP/IP protocols, flow control is achieved at least in part through use of a packet drop flow control mechanism. That is, a sender simply sends packets out into the network; and if a receiver does not have the resources to receive the packet, the packet is dropped. Such a network might also utilize end-to-end flow control mechanisms. Such a flow control scheme, however, is not feasible for networks where assurance that data will reach its intended destination is a high priority. An example of one such network is a storage area network ("SAN"). A packet drop solution is often considered an unacceptable flow control option for storage traffic. Accordingly, other protocols have been developed in the context of SANs and other networks that promise "lossless", or in real terms close to lossless, transport by using a link-level port to port scheme for lossless transport.

While effective in many ways, a link-level port to port scheme for lossless transport (whether the network is implemented using Fibre Channel (FC), Fibre Channel over Ethernet (FCoE), or another protocol) has the potential to make a network vulnerable to possibly serious flow control breakdowns when an end device or other device's ability to send messages signaling its availability to receive frames becomes impaired. (An end device may be a host/server or a storage device, for example.) Devices experiencing failed or impaired ability to send indications of availability or readiness to accept frames are referred to as "slow or no drain devices" for purposes of this disclosure. Even a single such malfunctioning end device or other device may cause serious disruptions to a network. This is because, in addition to slowing or stopping traffic to the slow or no drain device itself, such impairments can also impact data traffic flows to healthy devices. When one considers a real life network where typically the number of hosts and disks number in the tens or even hundreds of thousands, there will often be one or two hosts or disks that are slow or no drain at some point. The potentially widespread disruption to network flow control that may be caused by such devices is considered unacceptable in many networks.

It can be challenging to address the network flow control problems caused by slow or no-drain devices. It would be desirable to have more advanced flow control implementations to meet this challenge.

BRIEF DESCRIPTION OF THE DRAWINGS

The disclosure may best be understood by reference to the following description taken in conjunction with the accompanying drawings, which illustrate particular example embodiments.

DESCRIPTION OF PARTICULAR EMBODIMENTS

Figure 1:
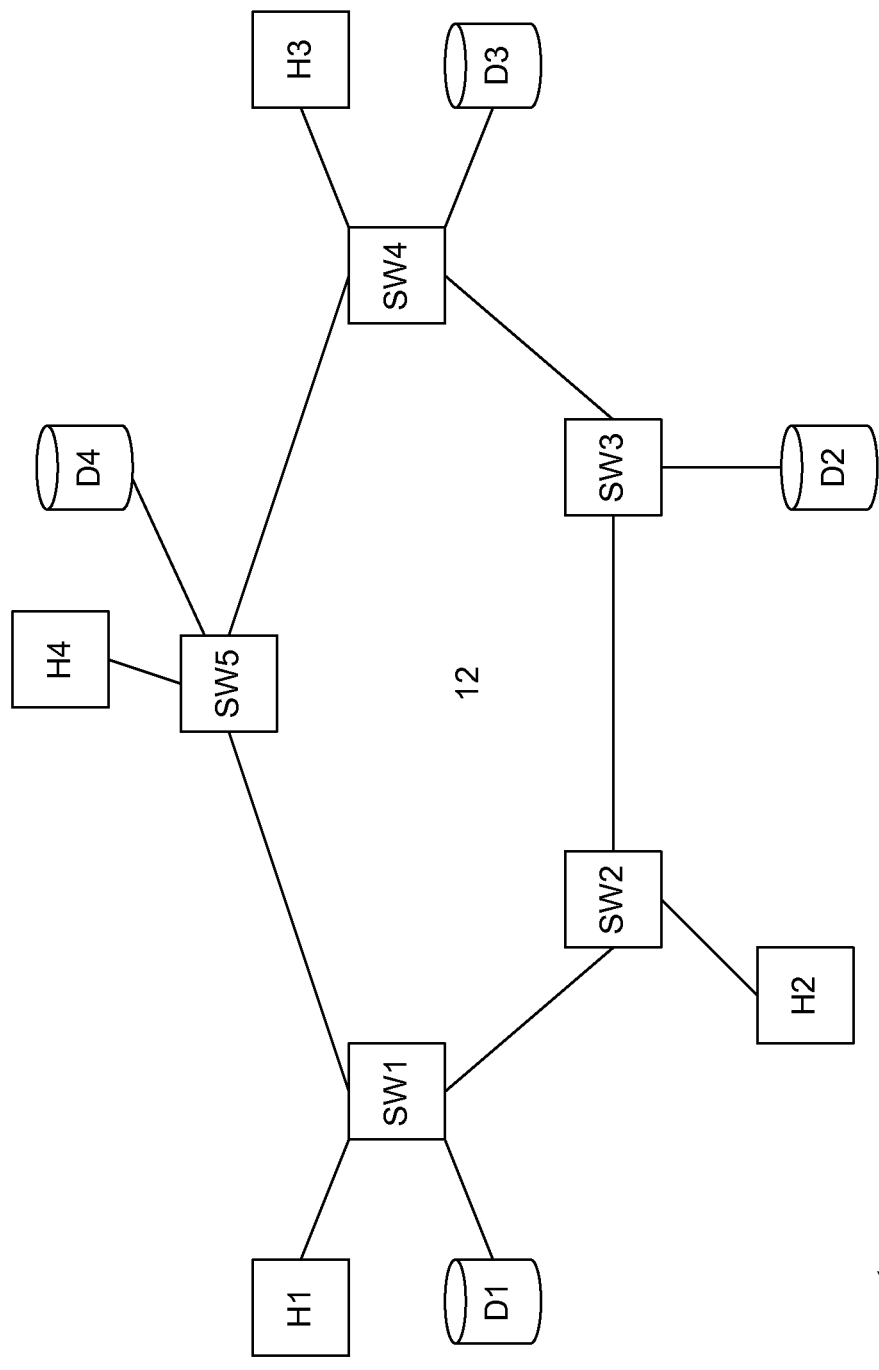
FIG. 1 shows an exemplary storage area network in accordance with embodiments of the present invention.

Reference will now be made in detail to some specific examples of the invention including the best modes contemplated by the inventors for carrying out the disclosed embodiments. Examples of these specific embodiments are illustrated in the accompanying drawings. While some embodiments of the invention are described in conjunction with these drawings, it will be understood that they are not intended to limit the invention to the described embodiments. On the contrary, the application is intended to cover alternatives, modifications, and equivalents as may be included within the spirit and scope of the disclosed embodiments.

For example, the techniques of some embodiments will be described in the context of particular applications and switches. However, it should be noted that the techniques of the disclosed embodiments apply to a variety of different applications and switches.

Various techniques and mechanisms of the disclosed embodiments will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. When a single device or article is described, it will be readily apparent that more than one device/article (whether or not they cooperate) may be used in place of a single device/article. Furthermore, the techniques and mechanisms of various embodiments will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

In the following description, numerous specific details are set forth in order to provide a thorough understanding of the disclosed embodiments. It will be understood, however, that alternatives of the disclosed embodiments may be practiced without some or all of these specific details. In other instances, well-known process steps have not been described in detail in order not to unnecessarily obscure the disclosed embodiments.

OVERVIEW

In one embodiment, an apparatus is provided which includes an ISL port having an assigned ISL frame timeout value; two or more edge ports, at least one of which has an assigned edge frame timeout value, wherein the ISL and edge frame timeout values determine an amount of time that frames can remain in the apparatus before being dropped, and wherein the ISL frame timeout value is shorter than the edge frame timeout value.

In another embodiment, a method is provided for receiving a frame at an ISL port of a network device, wherein the network device has two or more edge ports configured to link with edge devices, and one or more ISL ports configured to link to other switches, wherein at least one of the edge ports and at least one of the ISL ports has an assigned frame timeout value, the frame timeout values determining an amount of time frames can remain in the network device before being dropped, and wherein the frame timeout values assigned to the edge ports are shorter than the frame timeout values assigned to the ISL ports; time stamping the frame; sending the frame to an edge port of the switch; determining that the frame has been in the network device longer than the frame timeout value assigned to the edge port; and dropping the frame.

In a further embodiment, a method is provided which includes receiving at an edge port indications of availability or unavailability to receive frames from an edge device linked to the edge port receiving at an edge port indications of availability or unavailability to receive frames from an edge device linked to the edge port; monitoring an unavailability duration during which the edge device is unavailable to receive frames from the edge port; determining that the unavailability duration exceeds a predetermined response threshold; and in response to determining that the response threshold has been exceeded, dropping subsequently received frames destined for the edge device.

In another embodiments, an apparatus is provided which includes two or more edge ports configured to link with edge devices and receive indications of availability or unavailability to receive frames from edge devices linked to the edge ports, wherein at least one of the edge ports has an assigned response threshold relating to an unavailability duration during which an edge device linked to the edge port is unavailable to receive frames from the edge port. The apparatus also includes logic for monitoring at the edge port the unavailability duration; determining that the unavailability duration exceeds a predetermined response threshold; and in response to determining that the response threshold has been exceeded, dropping subsequently received frames destined for the edge device.

In a further embodiment, a method is provided which includes polling an edge port at defined time increments to determine whether a connected edge device is available to receive frames; after a defined time interval, evaluating the polling results; determining that the edge device has been unavailable to receive frames during the defined interval for greater than a specified response threshold time period; and in response to determining that response threshold time period has been exceeded, bringing down the edge port and/or notifying a network administrator.

In another embodiment, an apparatus is provided which includes two or more edge ports; logic for polling an edge port at defined time increments to determine whether a connected edge device is available to receive frames; after a defined time interval, evaluating the polling results; determining that the edge device has been unavailable to receive frames during the defined time interval for greater than a specified response threshold time period; and in response to determining that the response threshold time period has been exceeded, bringing down the port and/or notifying a network administrator.

EXAMPLE EMBODIMENTS

Various embodiments of the present invention address problems associated with the effects of congested interfaces on a fabric. Among other things, various embodiments help mitigate or completely solve the issue of slow or no drain devices affecting the fabric. One or more of the described embodiments can be used alone or in combination to address problems associated with inter-switch link blocking and the problem of flows not related to slow/no drain devices suffering the negative impacts of slow or no drain devices.

Various embodiments may operate on storage area networks (SANs). SANs provide an increasingly important mechanism for making shared storage available to multiple hosts. A SAN typically includes a number of storage devices, a plurality of hosts/servers, and a number of switches arranged in a switching fabric that connects the storage devices and the hosts. Most SANs rely on the Fibre Channel and/or Fibre Channel over Ethenet protocol for communication within the Fabric.

Note that the term switch as used herein includes a regular switch, a router, or other types of network devices that perform the function of relaying data to its ultimate destination. The term switch will be used to encompass all such variations herein for ease of description. The use of the term should not be construed to restrict or limit the invention to only regular switches.

Referring to FIG. 1, for context, an exemplary Storage Area Network (SAN) according to an embodiment of the present invention is shown. A storage area network (SAN) 10 includes a Switching Fabric 12 that includes a plurality of Fibre Channel switches SW1 through SW5. Also included in the SAN 10 are a plurality of hosts H1 through H4 and a plurality of storage devices D1 through D4. In the SAN shown in FIG. 1, the hosts can be any type of host including but not limited to servers or personal computers running on the Unix, Windows or any other computing platform. Similarly, the storage devices D1-D4 can be any type of storage device including but not limited to tape back-up systems, emulated tape back-up systems, CD-ROM storage arrays, or one or more disks such as a Redundant Array of Independent Disks (RAID). The switches SW1-SW5 can be any type of Fibre Channel switch such as those commercially available from Cisco Systems of San Jose, Calif., including Cisco's MDS and Nexus lines of switches.

The flow control mechanisms described herein can be used to address congestion in Fibre Channel (FC) and Fibre Channel over Ethernet (FCoE) networks. However, it will be appreciated that the invention should not be construed to be limited to networks using FC or FCoE protocols, and may be applied to various types of networks which use a fabric to transport data. For example, the invention may be applied to any network that uses a link-level mechanism for flow control, whereby a transmit port can only transmit packets or frames to a receive port on the same link if the receive port has provided an indication of availability or readiness to receive frames.

Note in other embodiments, the techniques of the present application may operate on networks that are not storage area networks. Further, in a Fibre Channel network, data is packaged into frames for transmission, and thus for ease of description, in describing embodiments of the invention below, the term frame will be used. However, the invention should not be construed to be limited to networks using frames.

As noted above, in some networks, packets or frames are simply sent out into a network for transmission without requiring any prior indication that a receive port has resources to accept the frames. In such systems, if a receive port on the data path is not able or ready to accept the packet or frame, the packet or frame is simply dropped at the time of receipt.

Other networks, such as FC and FCoE networks, however, guarantee lossless transport, and achieve such lossless transport by requiring receiving nodes to provide indications of availability to receive frames. For example, Fibre Channel ("FC") networks provide a handshake system where lossless transport is enabled through the use of a link-level port to port based credit scheme. The way this works is that, in Fibre Channel networks, the receive port on a link sends credits (sometimes called buffer to buffer credits) to the transmit port signaling an amount of data (usually described in terms of number of frames) the receive port has the resources to receive at a particular time. These port based buffer to buffer credits are link specific. That is, they are sent by the receive port of a particular link to the associated transmit port on the same link, and may only be used to send frames on that link. The use of such link-level credits provides a mechanism for Fibre Channel networks to insure that no frames are lost under normal conditions.

Fibre Channel over Ethernet ("FCoE") also provides mechanisms for assuring lossless transport, but its mechanisms for achieving this result operate in a slightly different manner. FCoE transports Fibre Channel frames over Ethernet networks, and Ethernet does not currently have a credit based mechanism for flow control. However, Ethernet has a PAUSE capability whereby a busy receive port on a link can send a control frame to the transmit port requesting a pause in transmission. Fibre Channel over Ethernet uses this optional IEEE 802.3x Ethernet feature to indicate a receiving device's availability to receive data, thus enabling Fibre Channel traffic to be transported on an Ethernet network in a lossless manner.

As noted above, the indications of availability to receive frames are link-specific. In some networks, an indication of availability to receive frames may be communicated in a negative manner by a receive port's failure to send messages (for example, a FCoE PAUSE message) requesting that the transmit port stop transmission to the device for a certain duration of time specified in the PAUSE message. A receive port's failure to send pause control frames is construed as an indication that the receive port has the resources to accept frames, and frames are forwarded to the receive port until such time as the receive port sends a PAUSE control frame. According to other embodiments, an indication of availability to receive further frames can be communicated in an affirmative manner by a receive port sending a credit message (for example, a READY TO RECEIVE messages) to the transmit port of the same link. Such messages can specify an amount of data, and operate as permission to send the specified amount of data.

As noted above, a link-level port to port scheme for lossless transport (whether the network is implemented using FC, FCoE, or other protocols) has the potential to make a network vulnerable to possibly serious flow control breakdowns when an end device or other device's ability to send messages signaling its availability to receive frames becomes impaired. (An end device may be a host/server or a storage device, for example.) Devices experiencing failed or impaired ability to send indications of availability or readiness to accept frames are referred to as "slow or no drain devices" for purposes of this disclosure. For example, slow or no drain devices can constitute devices that do not return a credit in an FC fabric or do not stop sending PAUSE frames in an FCoE fabric in a timely fashion. Even a single such malfunctioning end device or other device may cause serious disruptions to a network. This is because, in addition to slowing or stopping traffic to the slow or no drain device itself, such impairments can also impact data traffic flows to healthy devices. The frames destined to such slow/no drain devices may be required to be stored for a longer period of time than usual in the buffers of a switch which can cause buffer exhaustion in a switch, which in turn can cause congestion in the fabric.

Figure 2A:
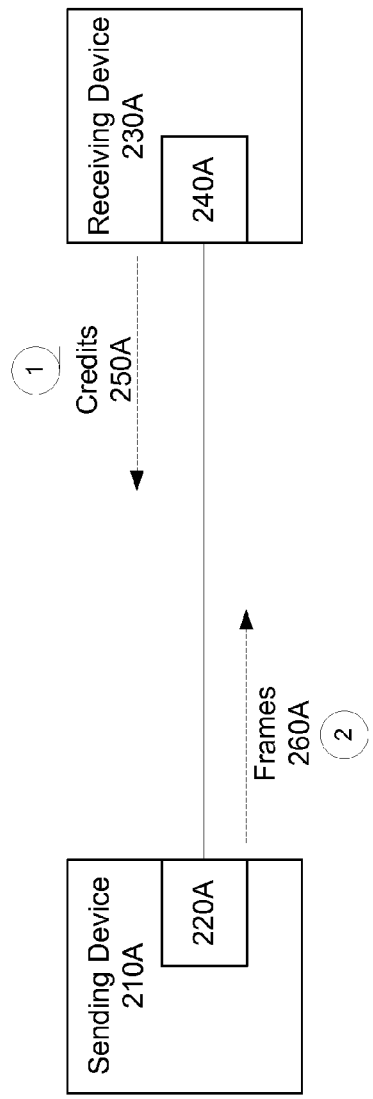
FIG. 2A is a block diagram depicting the effects of implementing credit messages on a simple network topology.
Figure 2B:
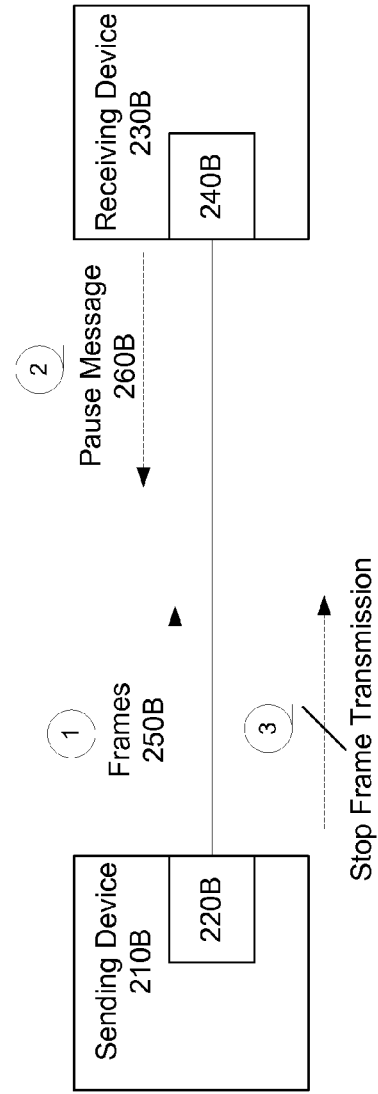
FIG. 2B is a block diagram depicting the effects of implementing pause messages on a simple network topology

Simple models of a system in which a sending device and a receiving device use link-level port to port indications of availability to receive data to achieve flow control are shown in FIGS. 2A and 2B. FIG. 2A is a block diagram depicting the effects of implementing credit messages on a simple network topology. A receive port 240A of a receiving device 230A (which might, for example, be a host or server) sends credits 250A to a transmit port 220A of a sending device 210A (for example, a storage device) indicating that the receive port 240A is ready and able to accept 8 frames. Such indications generally reflect how much buffering or storage capacity the receiving device has available. Upon receipt of the indications of availability, the transmit port 220A of the sending device 210A can send up to 8 frames. Then the transmit port 220A has to wait to receive more credits before it can send additional frames to the receive port 240A.

FIG. 2B is a block diagram depicting the effects of implementing pause messages in a simple network topology. A transmit port 210B of the sending device 210B is free to send frames 250B to the associated receive port 240B of the receiving device 230B until it receives a PAUSE message 260B from the receive port 240B. At that point, the transmit port 220B suspends transmission to the receive port 240B for the time period designated in the PAUSE frame 260B.

Figure 3:
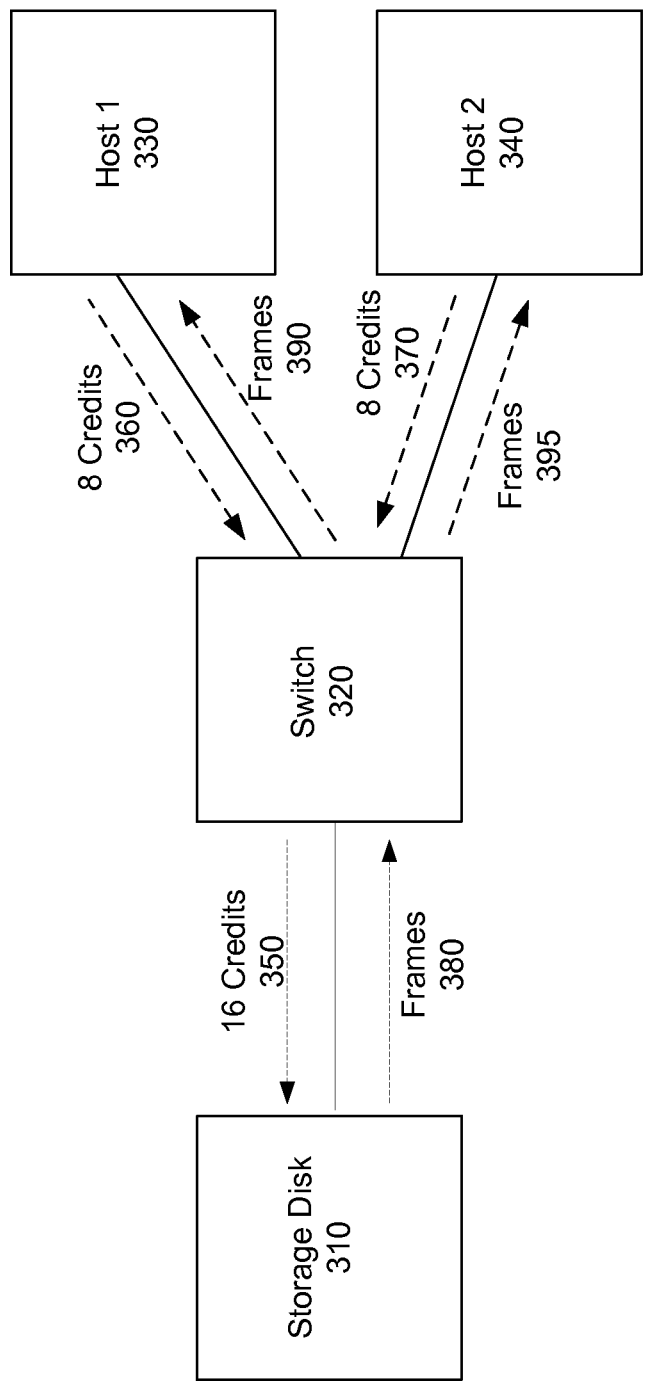
FIG. 3 is a block diagram depicting the effects of implementing buffer to buffer credits on a network topology including a switch.

In real life networks, the network topology has considerably more complexity than depicted in FIGS. 2A and 2B. A more complete picture of an exemplary network comprising a sending device, a switch, and a receiving device according to an embodiment of the present invention is shown in FIG. 3. As depicted in FIG. 3, the switch lies in the data path between the host/server and the storage device, and relays data from the storage device to the host/server.

FIG. 3 depicts a situation where a first host 330 and a second host 340 are concurrently trying to read data from a single storage disk 310. The hosts send a read command, and upon receiving the read command, the storage disk 310 sends read data to the switch 320. The switch 320 in turn forwards the read data to the first host 330 and the second host 340.

In normal operating conditions, in order for read data to be sent to the first host 330 and the second host 340, each host gives credits to the switch 320 indicating readiness to accept frames. If the first host 330 sends 8 credits 390, for example, the switch is able to send 8 frames to that host in the process freeing up its own buffer resources. The same applies to the second host 340. By freeing up buffer space, the switch 320 is able to issue its own credits 350 to the storage device signaling the switch's 320 availability to receive 16 frames. At that point, assuming 16 credits have been received at the storage disk 310, the storage disk 310 is able to send 16 frames 380 to the switch 320, which get buffered in the switch 320 for forwarding to the first host 330 and second host 340.

In the network shown in FIG. 3, if the second host 340 becomes impaired, it may be unable to send credits to the switch as quickly as usual. For example, for every 8 credits 360 the healthy first host 330 returns, the slow second host 340 can return only 4 credits 370. In this situation, buffers in the switch 320 will become predominantly taken up with frames 395 meant for the slow second host 340. This is because the switch 320 serves both hosts equally. So if fewer credits are sent by the slow or no drain second host 340, the frames 390 to the healthy host 330 will go out at their usual rate, but the frames 395 to the slow or no drain host 340 will trickle out.

As a consequence, the switch 320 may have to reduce the number of credits 360 it issues to the storage disk 310. As a result, the storage disk 310 can send fewer frames 380 to the switch 320 to forward to the hosts. Importantly, the switch 320 and the disk storage 310 may have to send fewer frames regardless of whether the frames are destined for the healthy first host 330 or the impaired second host 340, since credits are not end device specific. As a result, data traffic to the healthy host 330 will suffer.

Note, while a situation where data is being sent from a storage device to a host/server is shown in FIG. 3, the techniques of the present invention can apply equally to a reverse situation where data is being sent from a host/server to a storage device. The second situation might, for example, occur a host/server is writing data to a storage disk. In other embodiments, the slow or no drain device might not be an end device at all, but simply another switch in the network. The impacts on a network can be similar in each of these circumstances.

In contrast to an impaired slow device, there may also be situations where a device's ability to send indications of availability to receive frames comes to a complete stop, either because of faulty software or some other reason. Eventually this will result in a situation where, even if two hosts connected to the switch are completely independent, because the buffer capacity of the switch is being taken up entirely by frames for the stopped device, data traffic flow to the healthy host can eventually be stopped entirely. This occurs because even if the healthy host continues to return credits, the switch cannot use them because no frames for that host are pending in the switch.

Thus, where a device becomes a no drain device, a situation of total deadlock can result where a switch is permanently unable to transmit any frames to either the healthy first host or the stopped, no drain second host. In a real network where switches are connected to multiple hosts, such a situation can give rise to a situation where one or few malfunctioning hosts can stop transmission to many healthy hosts.

In order to prevent the above problems from arising, typically what most switches actually do is that they implement a frame aging out mechanism. If frames are stuck in a switch for a given period of time—which is usually a half second—the frames are aged out. Aging out a frame usually involves dropping the frame. When frames are aged out, buffer space can be freed up, enabling the switch to issue credits to the data sending device again. Since a switch is able to issue credits again, the storage disk is again able to send some frames to the healthy host, so at least some traffic flow to the healthy host can continue.

While useful, the stuck frame timeout solution has its limitations. First, it still takes time to drop packets from a switch buffer on the egress port linked to the malfunctioning node. As a result buffers on the switch's ingress ports that provide frames to multiple egress ports on the switch can become backlogged with frames to the malfunctioning node. Service to the properly functioning nodes suffers. Additionally, in a more real life network deployment of a fabric, a host and storage device are not usually connected by a single switch but by a series of multiple switches comprised of both edge switches directly connected to an end device, and core switches linking two or more of the other switches. A network with a two tier topology according to an embodiment of the present invention, where end devices are connected to separate edge switches, and the edge switches are connected by a core switch, is shown in FIG. 4.

Figure 4:
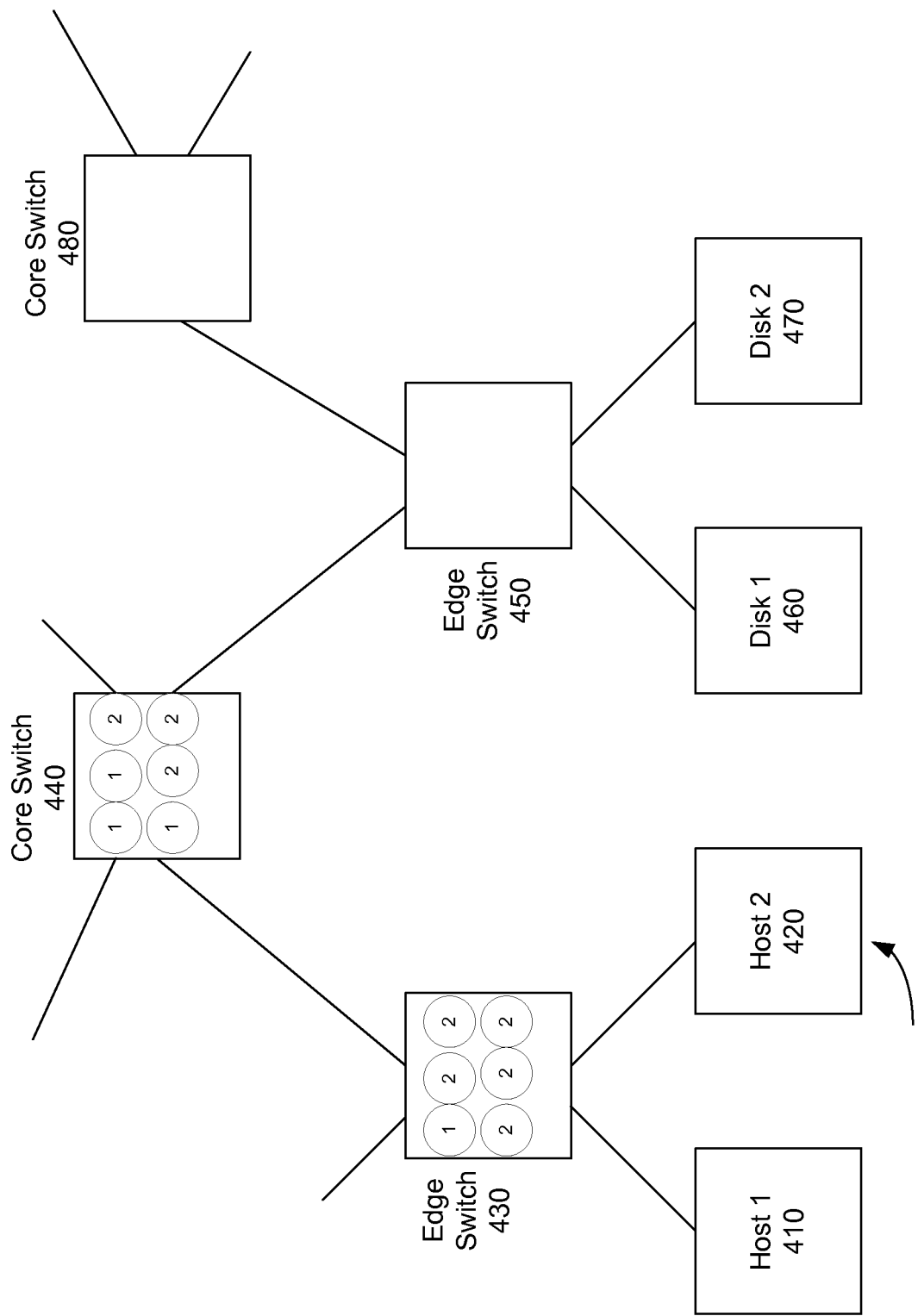
FIG. 4 is a block diagram depicting the effects of implementing buffer to buffer credits on a network topology including core switches and edge switches.

In FIG. 4, first storage devices 410 and second storage device 420 are each linked to an edge switch 430 which in turn is linked to a core switch 440 of the fabric, the core switch 440 is in turn linked to another edge switch 450, and that edge switch is in turn linked to a first host device 460 and a second host device 470. Note FIG. 4 shows two entirely different data flows, involving different hosts and storage disks, with the first host receiving data from the first storage device, and the second host receiving data from the second storage device. Ordinarily the data flows would operate independently. However, since both data flows travel over the same edge and core switches, an impairment in the ability of an end device in one flow to send indications of availability can affect the other data flow, because both data flows pass through the same switches. That is, in the embodiment depicted in FIG. 4, a slow or no drain device's negative impact on the network is not limited to data traffic flows to that particular device, but can also extend to every switch (whether a core switch or edge switch) on the data path between a host and the slow or no drain device, even in an implementation using stuck frame timeouts.

The way this occurs is as follows. When a frame first enters a switch, it is time stamped; and a switch periodically checks the age of frames in its buffers to see whether they have been in the switch longer than the given timeout period. If there are frames older than the aging out period, the switch drops the frames.

Assuming that the second host 420 become a slow or no drain device, because the second host 420 is providing indications of availability at a slower rate or not at all, over time, all or most of the read data in the buffers of the edge switch 430 linked to that host 420 become slow or no drain device frames.

At some point, because of slow or no drain device frames being stuck in the edge switch 430, the edge port 430 of the slow or no drain device 420 starts dropping frames pursuant to the stuck frame timeout mechanism. Aging out frames occurs in core switch 440 as well because the edge switch 420 linked to the slow or no drain device is not able to issues credits to the core switch 440 as quickly as usual, thus causing a back up of frames at the core switch 440.

In the case of the core switch 440, though, frames destined for the first host 410 and the second host 420 can be stuck in more equal numbers. Thus, a more serious situation can arise. At an edge switch, stuck frames are usually predominantly slow or no drain device frames, so the aging out mechanism generally primarily impacts slow or no drain frames. By contrast, if a switch, such as a core switch, carries traffic destined for multiple devices and has exhausted buffers due to a slow or no drain device, the flow to the normal working devices, as well as to the slow or no drain device, can also get stalled and the frames destined for the working devices can be subjected to the stuck frame timeout drop policy of the switch. Further, as a consequence, applications that initiated the traffic to the devices that are not slow or no drain might also encounter errors, and the errors might necessitate a recovery process, or even cause application termination.

Thus, in seeking to solve the original deadlock problem by using stuck frame timeouts, a network can end up penalizing data flows of completely unrelated and healthy devices. Dropping frames intended for a slow or no drain device can be considered acceptable in some circumstances, as the device is already malfunctioning in some way, and the frame drops ensure that other flows do not get negatively impacted. Dropping frames that are part of completely unrelated and healthy flows, however, is frequently considered unacceptable.

Note, in other embodiments, further compounding the problem, multiple additional layers of core switches 440 might exist between a host and a storage device. In such systems, the negative congestion impacts of a slow or no drain device could extend to flows between any end devices that have a data path through any of the affected switches.

Various embodiments of the present invention seek to mitigate the original deadlock problem and the problems caused by conventional use of stuck frame timeouts, by trying to limit the negative impacts of slow or no drain devices primarily or solely to data flows destined for the slow or no drain devices.

Figure 5:
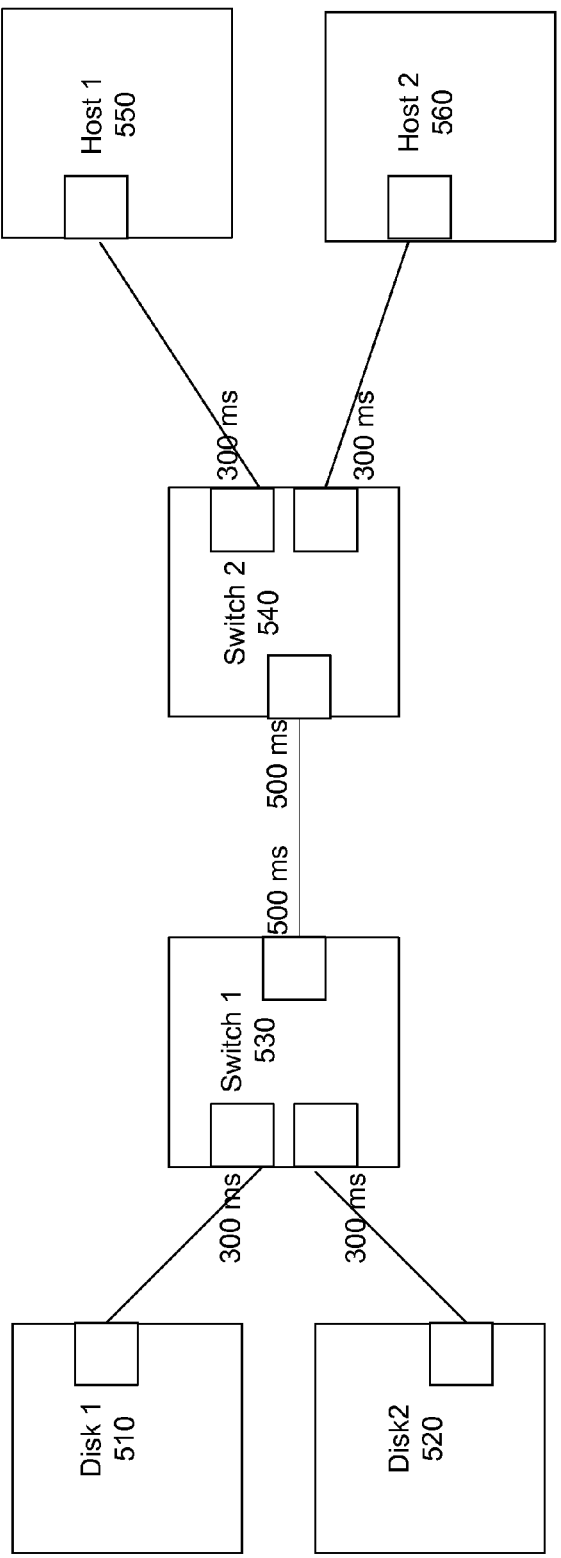
FIG. 5 is a block diagram in accordance with an embodiment of the invention.
Figure 6:
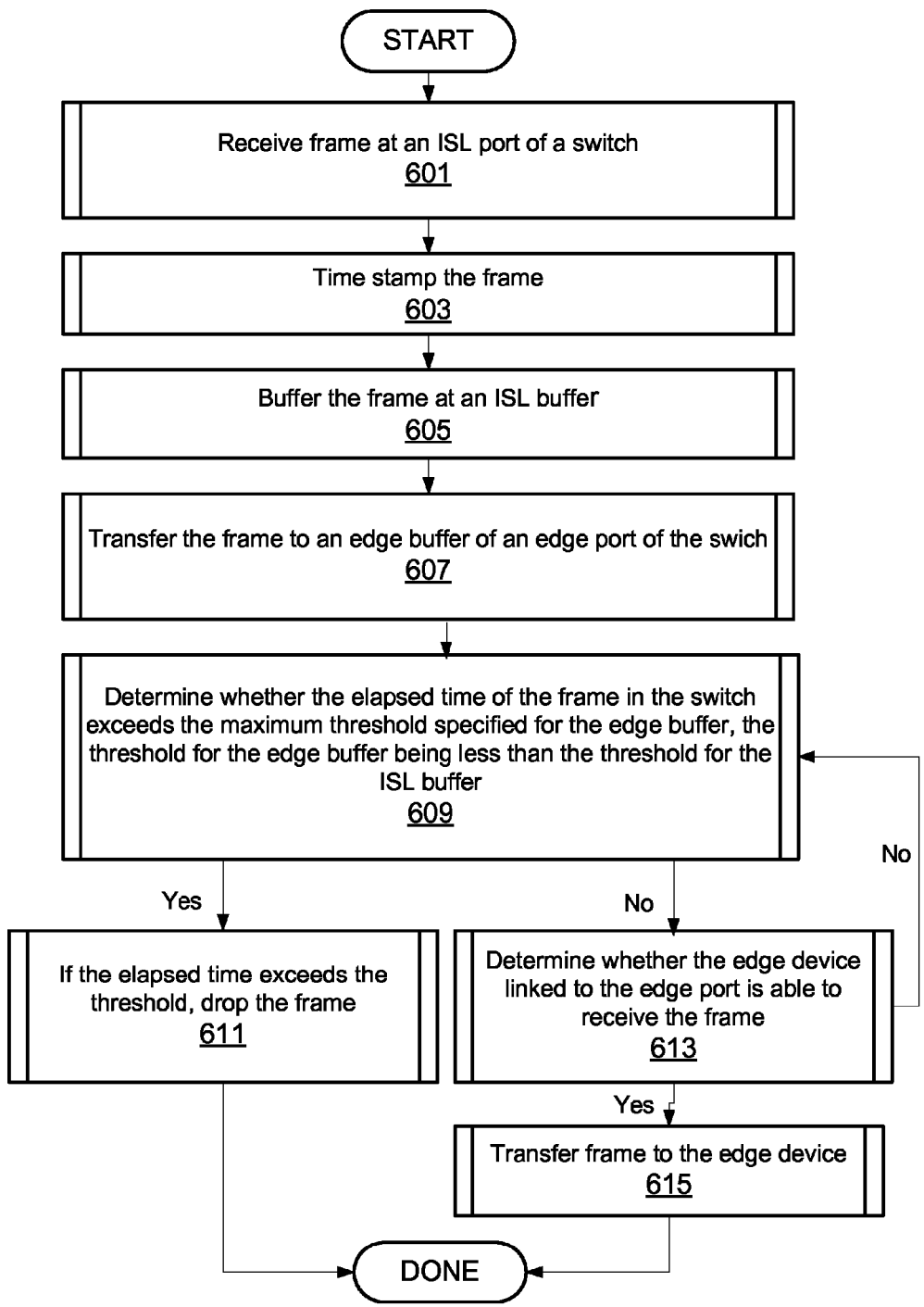
FIG. 6 is a flow diagram in accordance with an embodiment of the invention depicted in FIG. 5.

FIG. 5 is a block diagram depicting the effects of implementing buffer to buffer credits in a network topology including core switches and edge switches in accordance with a congestion drop embodiment of this invention. The switches depicted in FIG. 6 are configured to implement stuck frame timeouts.

Edge ports (commonly called F_ports in FC terminology) directly connect a switch to an edge device, whereas ISL ports (commonly called E_ports in FC terminology) connect switches to other switches. As shown in an embodiment of the present invention depicted in FIG. 5, instead of having a single stuck frame timeout value for the entire switch, which by default is assigned both to ISL interfaces and edge interfaces, two or more of the individual interfaces have independent stuck frame timeout values. In some cases, these values are fixed and in other cases they are configurable. In the depicted embodiment, edge interfaces are configured to have a stuck frame timeout value less than that of ISL interfaces. In a specific example, ISL ports (that is, ports linked to other switches) have been configured to have a stuck frame timeout value of 500 milliseconds, and edge ports (that is, ports linked to edge devices) have been configured to have a stuck frame timeout value of 300 milliseconds. Accordingly, if a frame is received at an edge port linked to an end device, the smaller timeout value can be used to age out frames. This can ensure to a great extent that the frames get dropped on edge interface that is attached to the slow/no drain device only and not on ISL interfaces. This is preferable because it reduces the impact of slow drain devices on healthy flows.

In various embodiments, when the switch is permitted to have different stuck frame timeout values for individual interfaces, one or more of the edge interfaces will have a shorter value than one or more of the ISL interfaces. The difference in timeout value generally will be at least about 50 milliseconds, or more typically at least about 100 milliseconds. The exact range will depend on the particular network topology at issue and can depend on connected devices, data traffic flows and how quickly the congestion needs to be tackled. The stuck frame timeout values for an edge interface and an ISL interface should be different, and the value for an edge interface should be less than the value for an ISL interface, but, in various embodiments, the precise difference can be left to the discretion of a network administrator by allowing for a range of values that are configurable by the network administrator.

In some embodiments, a transmit buffer at the edge ports performs the process of determining whether to age out frames. It periodically looks at the timestamps of the frames it is holding to determine whether the frame should be dropped, then drops frames as needed in accordance with the stuck frame timeout policy and its assigned frame timeout value. In other embodiments, one or more other elements of a switch can make this determination.

FIG. 6 shows at a high-level the process for mitigating the effects of slow or no drain devices as provided in the embodiment depicted in FIG. 5. Note this technique can be used alone or in conjunction with one or more of the below described techniques.

As shown, the process begins at a block 601 where a frame is received at a switch.

Next, at a block 603, the process time stamps the frame soon after it is received at the switch.

As shown in a block 605, the process then buffers the frame at an ISL buffer.

Next, at a block 607, the frame is then transferred to a buffer located at an edge port linked to an edge device.

Then, at a block 609, the process determines whether the elapsed time of the frame in the switch exceeds a stuck frame timeout threshold specified for the edge buffer, where the threshold for the edge buffer is less than the threshold for the ISL buffer. Note this determination can occur repeatedly as part of a process in which the switch periodically checks the frames in the edge buffer to determine whether they need to be aged out. The frame timeout value can be preconfigured, or can be user configurable.

If the frame's elapsed time in the switch is determined to exceed the age out time specified for the edge buffer, next, at a block 611, the frame is dropped.

On the other hand, if the frame's elapsed time in the switch is determined to not exceed the age out time specified for the edge buffer, next, at a block 613, it is determined whether the edge device has the resources to receive the frame.

Next, at a block 615, if the edge device is able to receive a frame, the process transfers the frame to the edge device.

If the edge device is not able to receive frames, the process returns to block 609 and determines again whether the elapsed time of the frame in the switch exceeds the age out time specified for the edge buffer.

An aging out solution, as noted above, can achieve the result of ensuring that frames are not "stuck" for too long in a switch, however, it may as a side effect result in frames that are part of healthy flows being dropped. In various embodiments, providing a shorter timeout value for edge ports insures that frames meant for slow or no drain devices are aged out sufficiently quickly, such that edge switches are always able to issue a reasonable number of credits to core switches, ensuring that fewer healthy frames are dropped.

Figure 7:
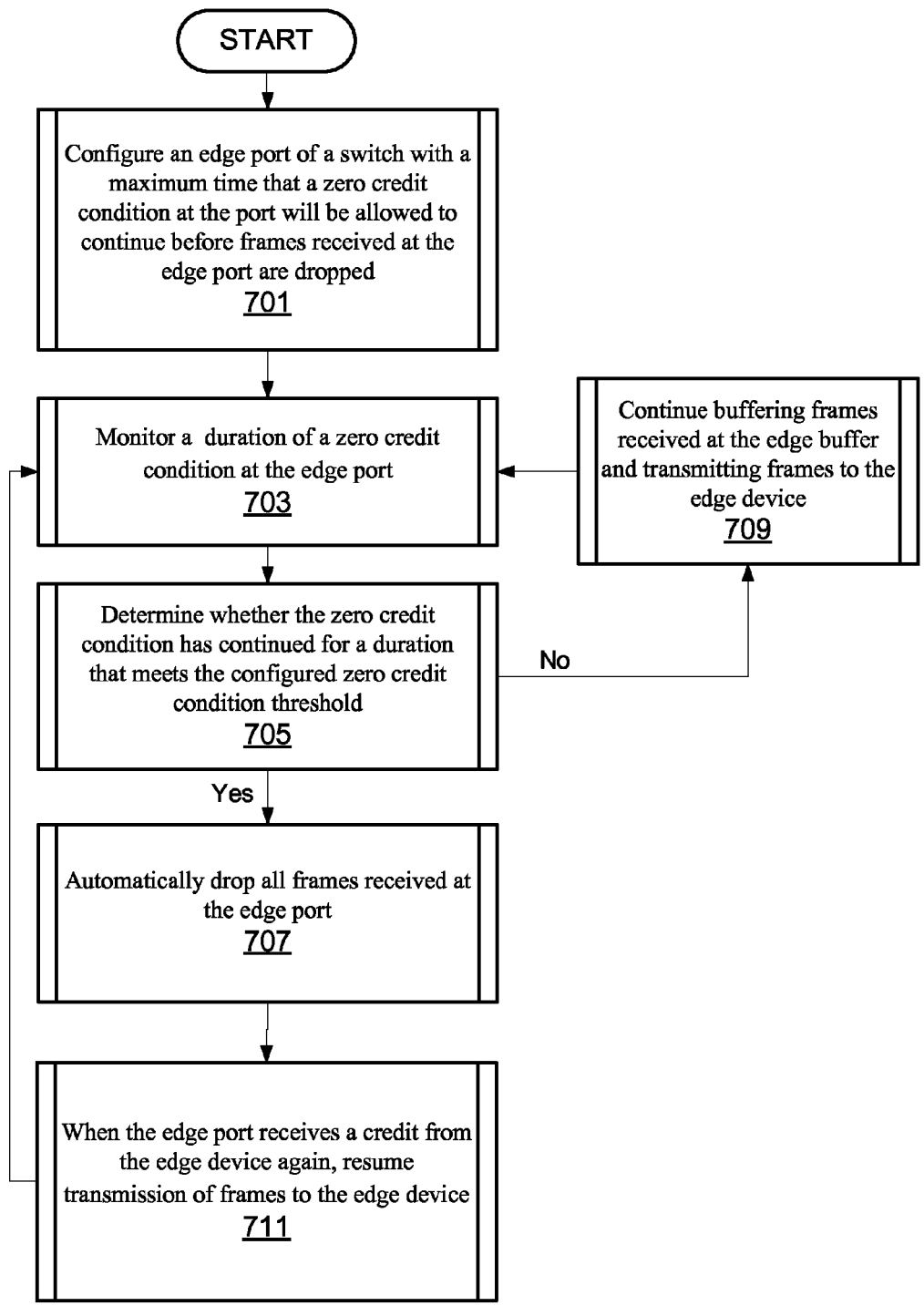
FIG. 7 is a flow diagram in accordance with an embodiment of the invention.

FIG. 7 shows at a high-level another process for mitigating the effects of slow or no drain devices as provided in certain embodiments. This process involves preemptively dropping frames destined for slow or no drain devices. Note this technique can be used alone or in conjunction with one or more of the above or below described techniques.

While effective for addressing the problem of slower end devices, the congestion drop mechanism described in FIGS. 5 and 6 might not be sufficient to fully address the problem of slow or no drain devices that are stopped or close to stopped. The presence of such devices, termed no-drain devices for convenience, on a network can permanently diminish the speed of links on the data path between a stopped host and a storage device due to the space that frames meant for such a no drain device consistently take up on the ISL and edge switch's buffers while they are waiting to be aged out. Thus, while allowing different time out values for edge ports and ISL ports will at least allow traffic to healthy devices to continue, such traffic can be at much reduced speeds. For example, a link that is typically able to run at 4 Gigabytes may be reduced to 1 to 2 Gigabytes. This embodiment seeks to mitigate these negative impacts of slow or no drain devices.

As shown, the process begins at a block 701 where an edge port of a switch is configured with a maximum threshold time that a zero credit condition at the port will be allowed to continue before frames received at the edge port are dropped. That is, a period of time during which a zero credit condition will be permitted to continue at the edge port, before the preemptive drop mechanism of this solution goes into effect, is configured. Note that the maximum threshold time could be preconfigured or user-configurable. Note also that this configuration, once set, could stay fixed for a substantial period of time, even for the life of the switch. As distinct from the steps shown in blocks 703 and 705 of FIG. 7, for example, the block 701 does not need to occur every time the process depicted in FIG. 7 occurs. Further, note that the embodiment depicted in FIG. 7 is described in terms of a credit based link level scheme for communicating availability to receive frames. Note that in alternative embodiments, the indications of availability or unavailability to receive frames might be communicated in the form of pause messages, rather than credit messages. In such embodiments, the maximum threshold time might refer to a duration of a period where transmission to the edge device stops as a result of receiving one or more PAUSE messages from the edge device, rather than the duration of a zero credit condition.

Next, at a block 703, the duration of a zero credit condition at the edge port, i.e., the duration of a state in which the edge port no longer has any outstanding credits from the linked edge deviced, is monitored.

Next, at a block 705, a determination is made whether the duration of the zero credit condition meets the maximum duration configured above for a permissible duration of a zero credit condition at the edge port.

Next, at a block 707, if the zero credit condition threshold has been exceeded, the switch automatically drops all frames received at the edge port. That is, in some embodiments, when an edge port runs out of credits, that is, stays continuously in a zero credit condition, for the configured zero credit duration threshold configured above, all frames received at the transmit buffer of the edge port can be immediately and automatically dropped. In some embodiments, the switch need not check the time stamp of the frames. Nor does the switch need to wait until an "aging out" time interval has passed. Rather, all frames received at the transmit buffer of an edge port will be automatically and immediately dropped once the threshold for a zero credit condition duration has been exceeded. In some embodiments, the frames can be dropped at the line rate at which the frames are received at the transmit buffer.

In other embodiments, in the alternative, a notification may also be sent to a network administrator identifying the problem and permitting the administrator to determine the appropriate response.

Next, at a block 711, the edge port can start buffering frames and transmitting frames to the edge device as soon as a credit is again received at the edge port from the edge device. In those embodiments, the receipt of another credit from the edge device acts as a trigger for again receiving frames at the edge port.

If, on the other hand, the zero credit condition threshold has not been met at the block 705, as shown in a block 709, frames will continue to be buffered at the transmit buffer of the edge port, and frames will continue to be transmitted to the edge device. Further, the duration of zero credit conditions at the edge port will continue to be monitored by the edge port, and the determination whether any zero credit condition has continued for the configured zero credit threshold, will continue to be made.

As noted above, in some embodiments, for example, in FCoE networks, the receipt of PAUSE frames which cause the interface to be paused for a threshold period of time can be monitored in place of a zero credit condition to accomplish the same result. That is, if a PAUSE frame has been received from the edge device linked to the edge port, which PAUSE frame requires a pause in transmission for a time period that exceeds the zero credit condition threshold, the edge port can be brought down.

Figure 8:
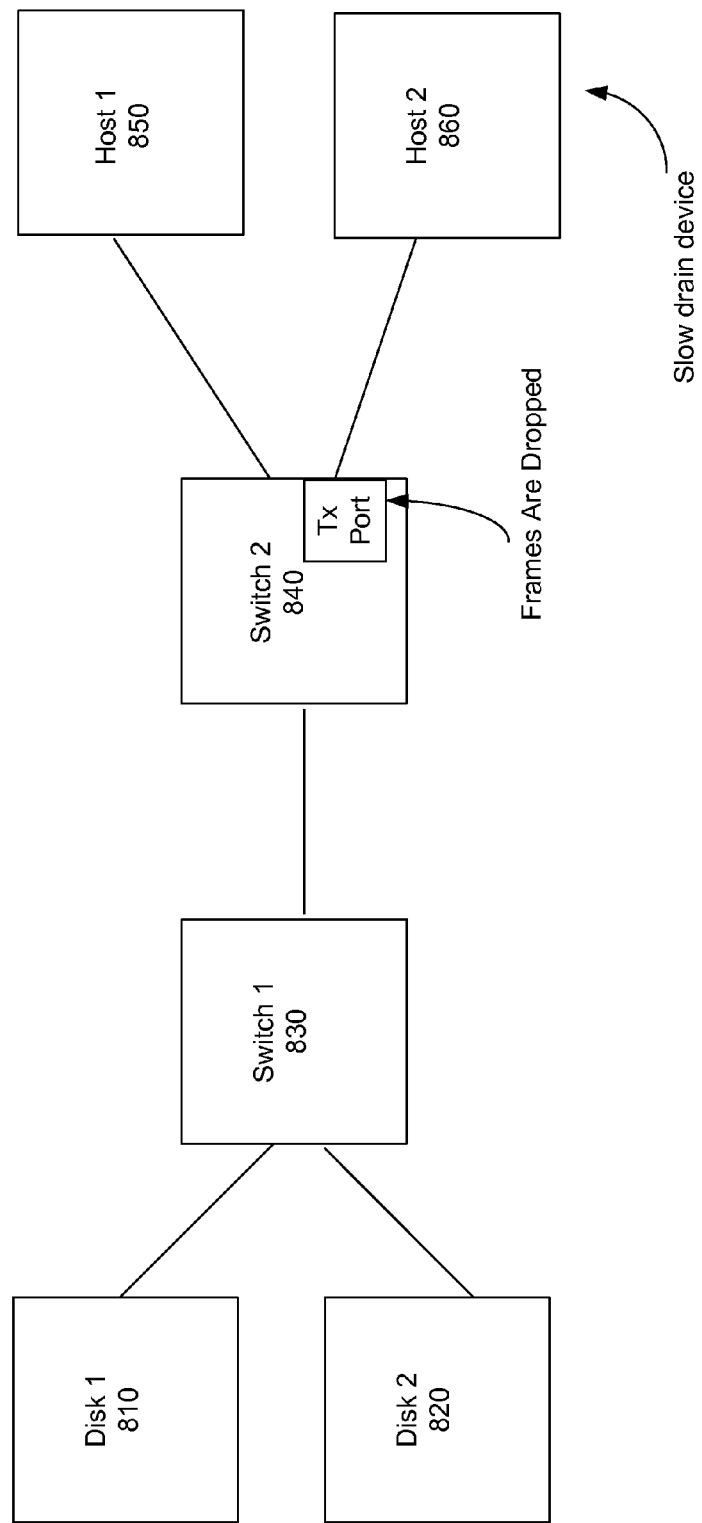
FIG. 8 is a block diagram in accordance with an embodiment of the invention depicted in FIG. 7.

FIG. 8 is a block diagram depicting the effects of implementing buffer to buffer credits in a network topology including core switches and edge switches in accordance with the preemptive drop embodiment of this invention depicted in FIG. 7. As described above, each edge port monitors the receipt of credits over time, and measures the duration of time during credits from a particular edge device are used up. When such a zero credit condition exists for a threshold period of time, an action can be triggered. As shown in FIG. 8, the threshold period is set to 500 milliseconds. More generally, the period of time may be between about 100 milliseconds and 500 milliseconds, in accordance with certain embodiments.

The advantage of preemptive drop solution shown in FIG. 7 is that frames destined to the slow/no drain device can get dropped as soon as they reach the transmit buffer of the transmit egress port. By contrast, in the congestion drop solution, the frames must remain in the transmit buffer for the configured time period of the stuck frame timeout before they can get aged out, taking up valuable buffer resources.

Figure 9:
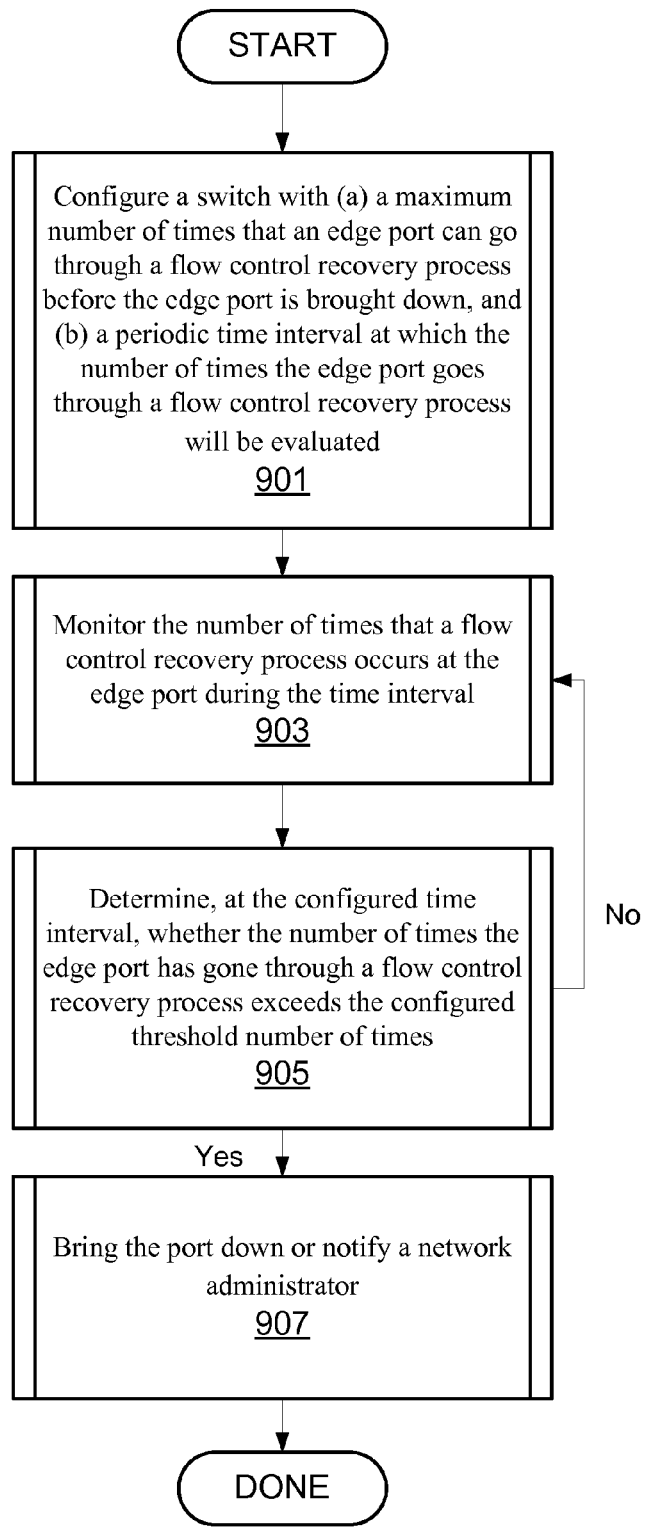
FIG. 9 is a flow diagram in accordance with an embodiment of the invention.

FIG. 9 shows at a high-level another process for mitigating the effects of slow or no drain devices as provided in certain embodiments. In this technique, the effects of a slow or no drain device are mitigated by bringing down an edge port. Note this technique can be used alone or in conjunction with one or more of the above or below described techniques.

While the techniques described in FIGS. 5 through 8 are effective for insuring the impacts of slow or no drain devices on a network are minimized, they can require continuous monitoring of slow or no drain devices, and thus take up system resources which could be used for other purposes. A flow diagram showing another embodiment whereby a slow or no drain device may be completely brought down is shown in FIG. 9. While the solution is more drastic, in certain circumstances, it can be appropriate to completely bring down an edge port connected to a slow or no drain device.

As shown, the process begins at block 901 where a switch is configured with (a) a maximum number of times that an edge port can go through a flow control recovery process before the edge port is brought down, and (b) a time interval at which the number of times the edge port goes through a flow control recovery process is evaluated. For example, the switch may be configured such that an edge port is brought down if a flow control recovery process occurs 3 or more times in an hour.

The above variables can be preconfigured or they can be configurable by a network administrator or other user. Further, a flow control recovery process might be a link reset recovery process or any other process that involves trying to reset or correct a flow control mechanism in a system.

Next, at a block 903, the number of times that a flow control recovery process occurs at the edge port is monitored. For example, one flow control recovery process might work as follows: An edge port measure the duration of any zero credit condition, that is, any period during which no credits for an edge device are held. The duration of time may correspond in some embodiments to a period of time preset in a Link Reset Recovery mechanism provided in Fibre Channel networks. Next, when an interface runs out of credits, stays continuously in a zero credit condition, for a threshold time period, which is usually fixed (for example, one second for edge ports and 1.5 seconds for ISL ports), link reset recovery can be initiated and a Link Reset primitive will be sent to the edge device. Then, the end device can be given a period of time to respond with a Link Reset Response ("LRR"). If a LRR is received within the period of time, the link reset recovery process resets the credit level of the end device to a number of credits that existed before the zero credit condition started. This whole series of events is considered to be one flow control recovery process for purposes of this solution.

Next, at a block 903, the switch continues to monitor the number of times that a flow control recovery process occurs at the switch. This will continue until the configured time interval for evaluating the number of times the edge port has gone through a flow control recovery process, has elapsed.

Next, at a block 905, once the configured time interval has passed, a determination is made whether the number of times the edge port has gone through a flow control recovery process exceeds the configured threshold number of times.

Then, at a block 907, if, during the time interval, the edge port has gone through a flow control recovery process at least the configured number of times, the switch can bring the edge port down. In some embodiments, a network administrator may also (or in the alternative) be notified of the situation. That is, if Link Reset recovery processes occur during the configured period of time for at least the configured number of times, the edge port linked to the slow or no drain device can be automatically brought down and/or a notification can be sent to a network administrator In the alternative, if the edge port has not gone through the flow control recovery process the configured number of times, the process will continue at the block 905 with monitoring the number of times that a flow control recovery process occurs at the edge port.

In some embodiments, the port may be brought back up after it is brought down in an effort to reboot or refresh the system.

In alternative embodiments, if the edge device fails to return a LRR, the port may be brought down immediately or shortly thereafter without requiring any other events to occur. In other embodiments having an even more extreme solution, once a LR message has been triggered, whether or not a LRR is sent by the edge device, the edge port can be brought down In some embodiments, a switch might be configured such that a user is able to set this feature in all ports, in all ISL ports, in all edge ports, or in particular designated ports.

In FCoE networks, receiving PAUSE frames causing the interface to be paused for a threshold period of time could be used in place of a zero credit condition described in the above disclosed embodiment as the trigger for a flow control recovery process. For example, rather than monitoring the duration of any zero credit conditions, a switch might monitor the occurrence of periods there transmission to an edge device is stopped because of PAUSE messages sent by the edge device, and if PAUSES occur more than a configured number of times during a configured time interval, the link can be brought down.

Bringing down a port may involve the use of procedures such as error disable or flapping the port. Port flapping involves ports turning down (off) and up (on) rapidly. The link might be brought down, and then brought back up, for example, in an effort to clear whatever error is affecting the end device and recover the disabled port.

Figure 10:
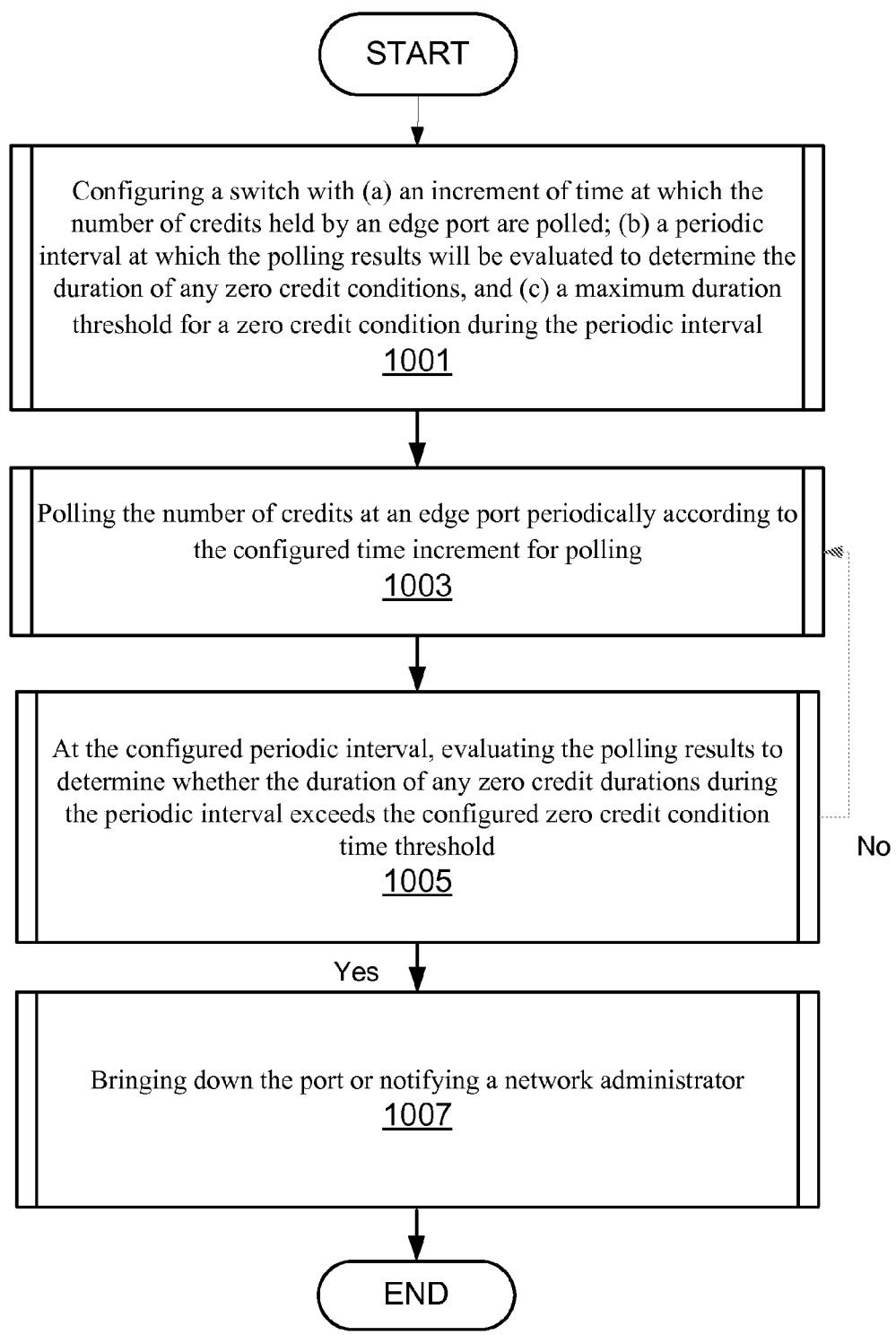
FIG. 10 is a flow diagram in accordance with an embodiment of the invention.

FIG. 10 shows at a high-level another process for mitigating the effects of slow or no drain devices as provided in certain embodiments. This process involves bringing down an edge port linked to a slow or no drain device when certain conditions are met as shown in FIG. 10. Note this technique can be used alone or in conjunction with one or more of the above or below described techniques.

As shown, the process begins at block 1001 where a switch is configured with (a) an increment of time at which the number of credits held by an edge port are polled, (b) a periodic interval at which the polling results will be evaluated to determine the duration of zero credit conditions, and (c) a maximum duration threshold for a zero credit condition during the periodic interval. The maximum duration threshold can be indicative of the length of a zero credit condition during a periodic interval that will be tolerated. This can be presented as a specified length of time, or as a specified fraction of the defined time interval. For example, the zero credit condition threshold in some embodiments might be set at a percentage, for example, 10 percent, of the periodic interval. Any or all of these variables can be preconfigured or be user configurable. Further, the threshold once set, might remain fixed for a substasntial period of time, and does not need to be reset as a part of normal operation of the embodiment shown in FIG. 10.

Next, at a block 1003, the number of credits at an edge port is polled periodically according to the configured time increment for polling. For example, if the time increment is set to 10 milliseconds, every 10 milliseconds, the process will check to see whether a zero credit condition, that is, no credits being available for an end device, is present.

Next, at block 1005, the process evaluates, at the configured periodic interval, the polling results to determine whether the duration of any zero credit conditions that occurred during the time interval in question exceeded the configured zero credit condition threshold. That is, the polling results are evaluated to determine the duration of any periods of zero credit conditions during that periodic interval. This means that, in some embodiments, the duration of any zero credit conditions is not measured at the time of polling, but only periodically, at the time intervals set by the configured periodic interval.

Next, in block 1007, if the duration of any period of zero credit conditions during the periodic interval exceeds the configured threshold, the edge port is brought down and/or a network administrator is notified.

In some embodiments, the process may further bring the port back up after it has been brought down.

Note that in alternative embodiments, the zero credit condition might be replaced with a condition concerning the duration of a PAUSE period.

As an example of this embodiment, assume the increment of time at which polling occurs is set for 100 milliseconds, and that the time period at which the duration of zero credit conditions is evaluated is set for 5 seconds. Under this configuration, every 10 milliseconds, the edge switch can poll whether credits are available to send frames to an end device. These polling results can be stored, and when the configured periodic interval has passed, in this example, five seconds, the switch can determine the duration of a zero credit condition during that periodic interval. If that amount or percentage of time exceeds a certain configured threshold, an action can be taken. That action may comprise immediately and automatically bringing down the port, so that ISLs and other flows on the ISLs do not get affected by slow/no drain device. In other embodiments, a network administrator may be notified of the congestion condition. For example, if the threshold duration of zero credit conditions is 20% of the time in a configured period (say 5 seconds), the interface can be brought down and/or a network administrator notified, if a zero credit conditions exists for at least one second during that period.

All of the above described techniques can be implemented independently or in conjunction with one or more of the other techniques.

Although illustrative embodiments and applications of this invention are shown and described herein, many variations and modifications are possible which remain within the concept, scope, and spirit of the invention, and these variations would become clear to those of ordinary skill in the art after perusal of this application. For instance, as noted above, the present invention is described as being applied to frames. However, it should be understood that the invention is not limited to such implementations, but instead would apply to packets as well. Moreover, the present invention would apply regardless of the context and system in which it is implemented. Thus, broadly speaking, the present invention need not be performed using the read operations described above, but may be used to support other operations in a FC or FCoE network.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus of this invention may be specially constructed for the required purposes, or may be a general-purpose programmable machine selectively activated or reconfigured by a computer program stored in memory. The processes presented herein are not inherently related to any particular router or other apparatus. In a preferred embodiment, any of the switches or routers of this invention may be specially configured network devices available from Cisco Systems, Inc. of San Jose, Calif., including the MDS family of switches manufactured by Cisco. A general structure for some of these machines will appear from the description given below.

Generally, the techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid of this invention may be implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. A general architecture for some of these machines will appear from the description given below. Further, the invention may be at least partially implemented on a card (e.g., an interface card) for a network device or a general-purpose computing device.

Figure 11:
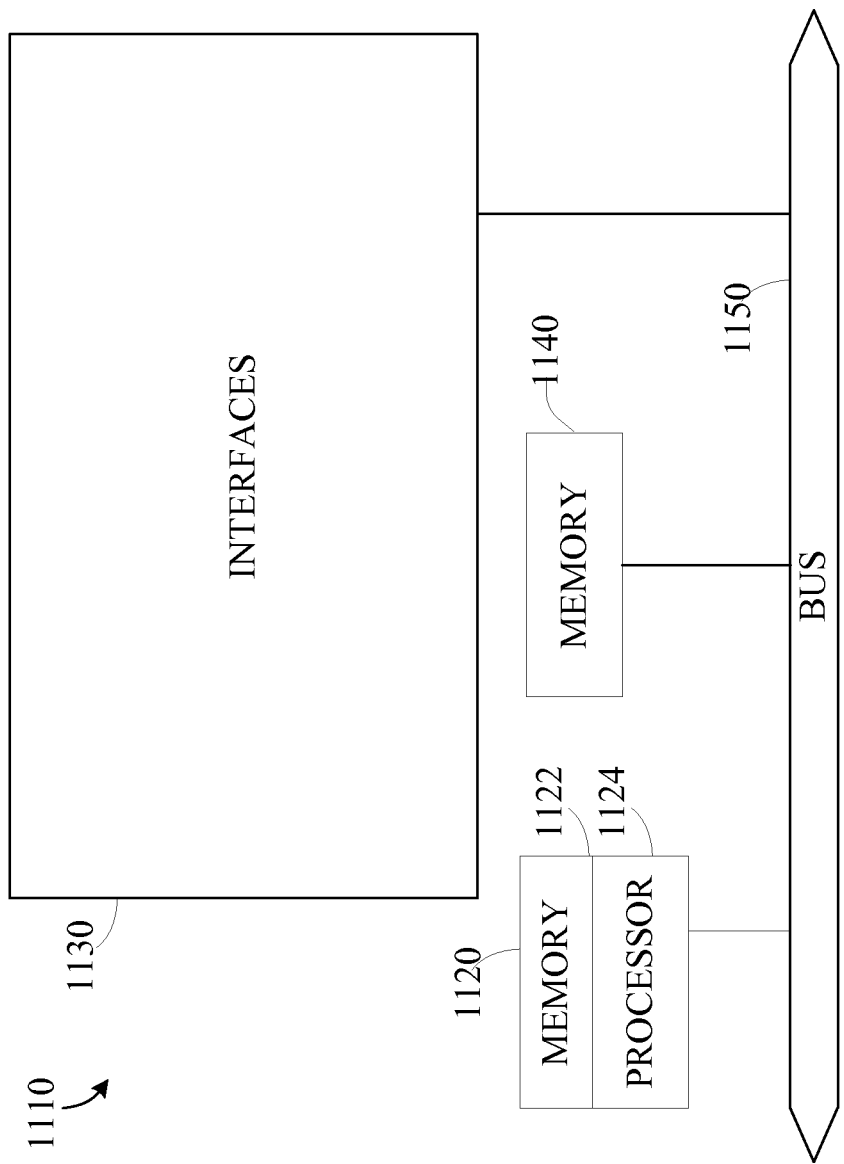
FIG. 11 illustrates a network device suitable for implementing embodiments of the present invention.

Referring now to FIG. 11, a router or switch 1110 suitable for implementing the present invention includes a master central processing unit (CPU) 1120, interfaces 1130, and a bus 1150 (e.g., a PCI bus). When acting under the control of appropriate software or firmware, the CPU 1120 is responsible for such router tasks as routing table computations and network management, as well as layer 2 and/or layer 3 tables including layer 2 and layer 3 information, respectively. It may also be responsible for updating various tables etc. It preferably accomplishes all these functions under the control of software including an operating system (e.g., the Nexus Operating System of Cisco Systems, Inc.) and any appropriate applications software. CPU 1120 may include one or more processors 1124 such as a processor from the Motorola family of microprocessors or the MIPS family of microprocessors. In an alternative embodiment, processor 1124 is specially designed hardware for controlling the operations of router 1110. In a specific embodiment, a memory 1122 (such as non-volatile RAM and/or ROM) also forms part of CPU 1120. However, there are many different ways in which memory could be coupled to the system.

The interfaces 1130 are typically provided as interface cards (sometimes referred to as "line cards"). Generally, they control the sending and receiving of data packets over the network and sometimes support other peripherals used with the router 1110. Among the interfaces that may be provided are Fibre Channel interfaces, Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1124 to efficiently perform routing computations, network diagnostics, security functions, etc.

Although the system shown in FIG. 11 is one specific network device (e.g., router or switch) of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules directly associated with the CPU (including memory 1122) and/or one or more separate memories or memory modules outside of the CPU (including memory 1140) configured to store program instructions for the general-purpose network operations and mechanisms for the functions described herein. The program instructions may control the operation of an operating system and/or one or more applications, for example. The memory or memories may also be configured to store tables such as layer 2 and layer 3 tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

In addition, although an example network device is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein.

What is claimed is:

1. An apparatus comprising:
    an ISL port having an assigned ISL frame timeout value;
    two or more edge ports, at least one of which has an assigned edge frame timeout value, wherein the two or more edge ports are each configured to receive indications of availability or unavailability to receive frames from an edge device linked to the edge port and send frames to the edge device based at least in part on said indications,
    wherein the ISL and edge frame timeout values determine an amount of time that frames can remain in the apparatus before being dropped, and
    wherein the edge frame timeout value is shorter than the ISL frame timeout value.

2. The apparatus of claim 1, wherein the apparatus supports Fibre Channel protocol.

3. The apparatus of claim 1, wherein the apparatus supports Fibre Channel over Ethernet protocol.

4. The apparatus of claim 1, wherein the frame timeout values are user configurable.

5. A method comprising:
    receiving a frame at an ISL port of a network device, wherein the network device has two or more edge ports configured to link with edge devices, and one or more ISL ports configured to link to other switches, wherein at least one of the edge ports and at least one of the ISL ports has an assigned frame timeout value, the frame timeout values determining an amount of time frames can remain in the network device before being dropped, and wherein the frame timeout values assigned to the edge ports are shorter than the frame timeout values assigned to the ISL ports; time stamping the frame;
    sending the frame to one of the edge ports, wherein the edge ports each receive indications of availability or unavailability to receive frames from an edge device linked to the edge port and determines when to send frames to the edge device based at least in part on said indications;
    determining whether the frame has been in the network device longer than the frame timeout value assigned to the edge port; and
    dropping the frame according to a result of the determining.

6. The method of claim 5, wherein the network device supports Fibre Channel protocol.

7. The method of claim 5, wherein the network device supports Fibre Channel over Ethernet protocol.

8. The method of claim 5, wherein the frame timeout values are user configurable.

9. A method comprising:
    receiving at an edge port indications of availability or unavailability to receive frames from an edge device linked to the edge port, wherein the edge port is configured to receive indications of availability or unavailability to receive frames from the edge device and send frames to the edge device based at least in part on said indications;
    monitoring an unavailability duration during which the edge device is unavailable to receive frames from the edge port;
    determining that the unavailability duration exceeds a predetermined response threshold; and
    in response to determining that the response threshold has been exceeded, dropping subsequently received frames destined for the edge device.

10. The method of claim 9, wherein subsequently received frames are dropped until an indication of availability to receive frames is received from the edge device.

11. The method of claim 9, wherein subsequently received frames are dropped when they are received by an edge buffer of the edge port.

12. The method of claim 9, wherein subsequently received frames are dropped when they are received by the edge port.

13. The method of claim 9, wherein frames already present in the edge port at a time the response threshold is exceeded are also dropped.

14. The method of claim 9, wherein the response threshold is user configurable.

15. An apparatus comprising two or more edge ports:
logic for polling an edge port at defined time increments to determine whether a connected edge device is available to receive frames, wherein the edge port is configured to receive indications of availability or unavailability to receive frames from the edge device and send frames to the edge device based at least in part on said indications;
after a defined time interval, evaluating the polling results;
determining that the edge device has been unavailable to receive frames during the defined time interval for greater than a specified response threshold time period; and
in response to determining that the response threshold time period has been exceeded, bringing down the port and/or notifying a network administrator.

16. The apparatus of claim 15, wherein the threshold time period is a fraction of the defined time interval.

17. The apparatus of claim 15, wherein the specified response threshold time period and/or the defined time interval are user configurable.

18. The apparatus of claim 15, wherein the edge ports each receive indications of availability or unavailability to receive frames from an edge device linked to the edge port.

* * * * *